US006912654B2

United States Patent
Murakami

(10) Patent No.: US 6,912,654 B2
(45) Date of Patent: Jun. 28, 2005

(54) SECRET KEY GENERATING METHOD, ENCRYPTION METHOD, CRYPTOGRAPHIC COMMUNICATION METHOD AND CRYPTOGRAPHIC COMMUNICATION SYSTEM

(75) Inventor: Yasuyuki Murakami, Kyoto (JP)

(73) Assignees: Murata Kikai Kabushiki Kaisha, Kyoto (JP); Masao Kasahara, Osaka (JP)

(*) Notice: Subject to any disclaimer, the term of this patent is extended or adjusted under 35 U.S.C. 154(b) by 894 days.

(21) Appl. No.: 09/768,130

(22) Filed: Jan. 23, 2001

(65) Prior Publication Data

US 2001/0010724 A1 Aug. 2, 2001

(30) Foreign Application Priority Data

Jan. 25, 2000 (JP) ........................................ 2000-016358

(51) Int. Cl.⁷ ................................................ H04L 9/00
(52) U.S. Cl. .......................... 713/155; 713/171; 380/44; 380/283
(58) Field of Search .................... 380/44, 282; 713/155, 713/171

(56) References Cited

U.S. PATENT DOCUMENTS

| | | | | | |
|---|---|---|---|---|---|
| 4,760,600 | A | * | 7/1988 | Nakai | 380/264 |
| 5,016,276 | A | * | 5/1991 | Matumoto et al. | 380/45 |
| 5,251,258 | A | * | 10/1993 | Tanaka | 380/282 |
| 5,966,449 | A | * | 10/1999 | Iwamura et al. | 380/44 |
| 6,332,025 | B2 | * | 12/2001 | Takahashi et al. | 380/281 |
| 6,658,114 | B1 | * | 12/2003 | Farn et al. | 380/277 |

FOREIGN PATENT DOCUMENTS

| | | | | | |
|---|---|---|---|---|---|
| JP | 07013485 A | * | 1/1995 | ............. | G09C/1/00 |
| JP | 07046234 A | * | 2/1995 | ............. | H04L/9/06 |
| JP | 07175411 A | * | 7/1995 | ............. | G09C/1/00 |
| JP | 08297467 A | * | 11/1996 | ............. | G09C/1/00 |
| JP | 10164045 A | * | 6/1998 | ............. | H04L/9/08 |
| JP | 10210024 A | * | 8/1998 | ............. | H04L/9/08 |
| JP | 11163850 A | * | 6/1999 | ............. | H04L/9/08 |
| JP | 2000165374 A | * | 6/2000 | ............. | H04L/9/08 |

OTHER PUBLICATIONS

Coppersmith, Don. "Attack on the Cryptographic Scheme NIKS–TAS".*

Du, Xinjun et al. "An Improved ID–based Authenticated Group Key Agreement Scheme".*

Murakami, Yasuyuki et al. "A New Probabilistic ID–based Non–interactive Key Sharing Scheme", Jan. 2000.*

Okamoto, Eiji et al. "Identity–Based Information Security Management System for Personal Computer Networks", Feb. 1989.*

(Continued)

Primary Examiner—Gregory Morse
Assistant Examiner—Michael J. Simitoski
(74) Attorney, Agent, or Firm—Hogan & Hartson, LLP

(57) ABSTRACT

A secret key of an entity is generated at each key generating agency (center) by using divided identification information obtained by dividing identification information of the entity into a plurality of blocks and a hash value which consists of a plurality of bits and is set for each key generating agency (center). A plurality of bits of any order are selected for each key generating agency (center) from an original hash-value sequence consisting of a predetermined sequence of a plurality of bits so as to set the hash value for each key generating agency (center). When a new key generating agency (center) is added to a plurality of existing key generating agencies (centers), a hash value is set for the new key generating agency (center) without changing the hash values of the existing key generating agencies (centers).

2 Claims, 5 Drawing Sheets

OTHER PUBLICATIONS

Sakakibara, Hiroyuki et al. "The ID–based Non–interactive Group Communication Key Sharing Scheme using Smart Cards", 1994 IEEE.*

Tanaka, Hatsukazu. "Identity–Based Non–interactive Key Sharing Equivalent to RSA Public–Key Cryptosystem", 1998 IEEE.*

Tanaka, Hatsuichi. DERWENT Abstract of JP 07013485 A.*
Tanaka, Hatsuichi. DERWENT Abstract of JP 07046234 A.*
Tanaka, Hatsuichi. DERWENT Abstract of JP 0715411 A.
Tanaka, Hatsuichi. DERWENT Abstract of JP 08297467 A.
Tanaka, Hatsuichi et al. DERWENT Abstract of JP 10210024 A.
Tanaka, Hatsuichi et al. DERWENT Abstract of JP 10164045 A.
Tanaka, Hatsuichi et al. DERWENT Abstract of JP 11163850 A.
Tanaka, Hatsuichi et al. DERWENT Abstract of JP 2000165374 A.

Rolf Blom, "Non–Public Key Distribution", Linköping University, New York: Plenum Press, pp. 231–236.

Adi Shamir, "Identity–Based Cryptosystems and Signature Schemes", Weizmann Institute of Science, Springer–Verlag, pp. 47–53.

* cited by examiner

SECRET KEY GENERATING METHOD, ENCRYPTION METHOD, CRYPTOGRAPHIC COMMUNICATION METHOD AND CRYPTOGRAPHIC COMMUNICATION SYSTEM

BACKGROUND OF THE INVENTION

The present invention relates to a secret key generating method for generating secret keys of an entity at a plurality of key generating agencies (centers), an encryption method for encrypting information so that parties other than the party concerned are prevented from knowing the content of the information, a cryptographic communication method and cryptographic communication system for performing cryptographic communication, and a memory product/data signal embodied in carrier wave for recording/transferring an operation program of this secret key generating method.

In the modern society, called a highly information-oriented society, based on a computer network, important business documents and image information are transmitted and communicated in a form of electronic information. Such electronic information cab be easily copied, so that it tends to be difficult to discriminate its copy and original from each other, thus bringing about an important issue of data integrity. In particular, it is indispensable for establishment of a highly information oriented society to implement such a computer network that meets the factors of "sharing of computer resources," "multi-accessing," and "globalization," which however includes various factors contradicting the problem of data integrity among the parties concerned. In an attempt to eliminate those contradictions, encrypting technologies which have been mainly used in the past military and diplomatic fields in the human history are attracting world attention as an effective method for that purpose.

A cipher communication is defined as exchanging information in such a manner that no one other than the participants can understand the meaning of the information. In the field of the cipher communication, encryption is defined as converting an original text (plaintext) that can be understood by anyone into a text (ciphertext) that cannot be understood by the third party and decryption is defined as restoring a ciphertext into a plaintext, and cryptosystem is defined as the overall processes covering both encryption and decryption. The encrypting and decrypting processes use secret information called an encryption key and a decryption key, respectively. Since the secret decryption key is necessary in decryption, only those knowing this decryption key can decrypt ciphertexts, thus maintaining data security.

The encryption key and the decryption key may be either the same or different from each other. A cryptosystem using the same key is called a common-key cryptosystem, and DES (Data Encryption Standards) employed by the Standard Agency of the USA Commerce Ministry is a typical example. As an example of the cryptosystem using the keys different from each other, a cryptosystem called a public-key cryptosystem has been proposed. In the public-key cryptosystem, each user (entity) utilizing this cryptosystem generates a pair of encryption and decryption keys and publicizes the encryption key in a public key list, thereby keeping only the decryption key in secret. In this public-key cryptosystem, the paired encryption and decryption keys are different from each other, so that the public-key cryptosystem has a feature that the decryption key cannot be known from the encryption key with a one-way function.

The public-key cryptosystem is a breakthrough in cryptosystem which publicizes the encryption key and meets the above-mentioned three factors required for establishing highly information-oriented society, so that it has been studied actively for its application in the field of information communication technologies, thus leading RSA cryptosystem being proposed as a typical public-key cryptosystem. This RSA cryptosystem has been implemented by utilizing the difficulty of factorization into prime factors as the one-way function. Also, a variety of other public-key cryptosystems have been proposed that utilize the difficulty of solving discrete logarithm problems.

Besides, a cryptosystem has been proposed that utilizes ID (identity) information identifying individuals, such as post address and name of each entity. This cryptosystem generates an encryption/decryption key common to a sender and a receiver based on ID information. Besides, the following ID-information based cryptosystems are provided: (1) a technique which needs a preliminary communication between the sender and the receiver prior to a ciphertext communication and (2) a technique which does not need a preliminary communication between the sender and the receiver prior to a ciphertext communication. The technique (2), in particular, does not need a preliminary communication, so that its entities are very convenient in use, thus considered as a nucleus for the future cryptosystems.

A cryptosystem according to this technique (2) is called ID-NIKS (ID-based non-interactive key sharing scheme), whereby sharing an encryption key without a preliminary communication is enabled by employing ID information of a communication partner. The ID-NIKS needs not exchange a public key or a secret key between a sender and a receiver nor receive a key list or services from third parties, thus securing safe communications between any given entities.

FIG. 1 shows principles for this ID-NIKS system. This system assumes the presence of a reliable center as a key generating agency, around which a common-key generation system is configured. In FIG. 1, the information specific to an entity A, i.e. its ID information of a name, a post address, a telephone number, etc. is represented by $h(ID_A)$ using a hash function $h(\cdot)$. For an any given entity A, the center calculates secret information $S_{Ai}$ as follows on the basis of center public information $\{P_{ci}\}$, center secret information $\{SC_i\}$ and ID information $h(ID_A)$ of the entity A, and sends it to the entity A secretly:

$$S_{Ai}=F_i(\{SC_i\}, \{PC_i\}, h(ID_A))$$

The entity A generates, for communications between itself and another arbitrary entity B, a common key $K_{AB}$ for encryption and decryption with its own secret $\{S_{Ai}\}$, center public information $\{PC_i\}$ and entity B's ID information $h(ID_B)$ of the partner entity B as follows:

$$K_{AB}=f(\{S_{Ai}\}, \{PC_i\}, h(ID_B))$$

The entity B also generates a common key $K_{BA}$ for the entity A similarly. If a relationship of $K_{AB}=K_{BA}$ holds true always, these keys $K_{AB}$ and $K_{BA}$ can be used as the encryption and decryption keys between the entities A and B.

In the above-mentioned public-key cryptosystem, for example, an RSA cryptosystem, its public key measures 10-fold and more as long as the presently used telephone number, thus being very troublesome. To guard against this, in the ID-NIKS, each ID information can be registered in a form of name list to thereby be referenced in generating a common key used between any given entities. Therefore, by safely implementing such an ID-NIKS system as shown in FIG. 1, a convenient cryptosystem can be installed over a computer network to which a lot of entities are subscribed. For these reasons, the ID-NIKS is expected to constitute a core of the future cryptosystem.

The ID-NIKS has the following two problems. One is that the center becomes Big Brother (the center holds the secrets of all entities and functions as a Key Escrow System). Another problem is that there is a possibility that, when a certain number of entities collude with each other, they can calculate a secret of the center. While various measures have been taken to prevent the collusion problem in terms of quantity of calculation, it is difficult to completely solve this problem.

The cause of the difficulty in solving this collusion problem is that secret parameters based on identification information (ID information) have the dual structure consisting of a center secret and a private secret. In the ID-NIKS, a cryptosystem consists of a publicized parameter of the center, publicized identification information. (ID information) of an individual and this two kinds of secret parameters, and it is necessary to design the cryptosystem so that, even when entities show each other their private secrets distributed to them, the center secret is not revealed. Thus, for the realization of such a cryptosystem, there are many problems to be solved.

Then, the present inventors have proposed a secret key generating method, an encryption method and a cryptographic communication method (hereinafter referred to as the "prior example") based on the ID-NIKS, which can minimize the mathematical structure, avoid the collusion problem and readily construct the cryptosystem by dividing the identification information (ID information) into some blocks and distributing all secret keys based on the divided information (ID information) from a plurality of centers to an entity.

The reason why various types of cryptosystem based on the identification information (ID information) of an entity, which were proposed to solve the collusion problem, did not succeed was that the measures taken to prevent the center secret from being calculated from collusion information of the entities depended excessively on the mathematical structure. When the mathematical structure is too complicated, a method for verifying security also becomes difficult. Therefore, in the proposed method of the prior example, the identification information (ID information) of an entity is divided into some blocks and all the secret keys for the respective divided identification information (ID information) are distributed to the entity, thereby minimizing the mathematical structure.

In the prior example, a plurality of reliable centers are provided, and the centers generate secret keys having no mathematical structure and corresponding to the respective divided identification information (ID information) of each entity, and send the secret keys to each entity. Each entity generates a common key from the secret keys sent from the respective centers and the publicized identification information (ID information) of the communicating party, without preliminary communication. Therefore, a single center can never hold the secrets of all entities, and each center can never become Big Brother.

Moreover, the present inventors are pursuing their research to improve such a prior example and to construct a cryptographic communication system adopting the prior example. In such a cryptographic communication system, the security can be improved by increasing the number of the centers. It is thus supposed that a new center will frequently be added to a cryptographic communication system which is actually constructed by a certain number of centers.

Whenever a new center is caused to additionally participate in the cryptographic communication system, a new hash value must be set for each of the existing centers and the new center to construct a new overall hash function system, and thus changing of the overall system is unavoidable. In order to cope with the addition of a new center without changing the overall system, the following measures can be taken: each center publicizing its own hash function; and presetting a hash function of a sufficiently long bit length. In the former measure, however, it is not easy for each entity to incorporate a new hash function into its key sharing software. The latter measure poses a problem that, even if a hash function of a tremendously long bit length is prepared, the number of centers to be added is limited.

BRIEF SUMMARY OF THE INVENTION

An object of the present invention is to provide a secret key generating method, encryption method, cryptographic communication method and cryptographic communication system, which do not require changing of the hash values of the existing key generating agencies (centers) even when a new key generating agency (center) is added and can readily add a number of new key generating agencies (centers) while improving the security, and to provide a memory product/data signal embodied in carrier wave for recording/transferring an operation program of this secret key generating method.

In the present invention, when generating secret keys of an entity at a plurality of key generating agencies (centers), respectively, by using respective divided identification information obtained by dividing the identification information of the entity into a plurality of blocks and hash values, each consisting of a plurality of bits, set for each of the key generating agencies (centers), a plurality of bits of any order are selected for each of the key generating agencies(centers) from a predetermined sequence of a plurality of bits so as to set the hash value for each of the key generating agencies (centers).

In the present invention, a plurality of bits of any order are selected for each key generating agency (center) from an original hash-value sequence consisting of a predetermined sequence of a plurality of bits, and the selected plurality of bits are set as a hash value for each key generating agency (center). Accordingly, even when a hash value consisting of a plurality of bits is set for each of existing key generating agencies (centers), a hash value different from the hash values of the existing key generating agencies (centers) can be set for a new key generating agency (center), without changing the hash values of the existing key generating agencies (centers), by using a plurality of bits selected from the original hash-value sequence. It is therefore possible to readily add a number of new key generating agencies (centers) to a cryptographic communication system based on the ID-NIKS, without changing the hash values of the existing key generating agencies (centers).

The above and further objects and features of the invention will more fully be apparent from the following detailed description with accompanying drawings.

DETAILED DESCRIPTION OF THE INVENTION

The present invention will be described in detail below with reference to the drawings illustrating the embodiment thereof.

Figure 1:
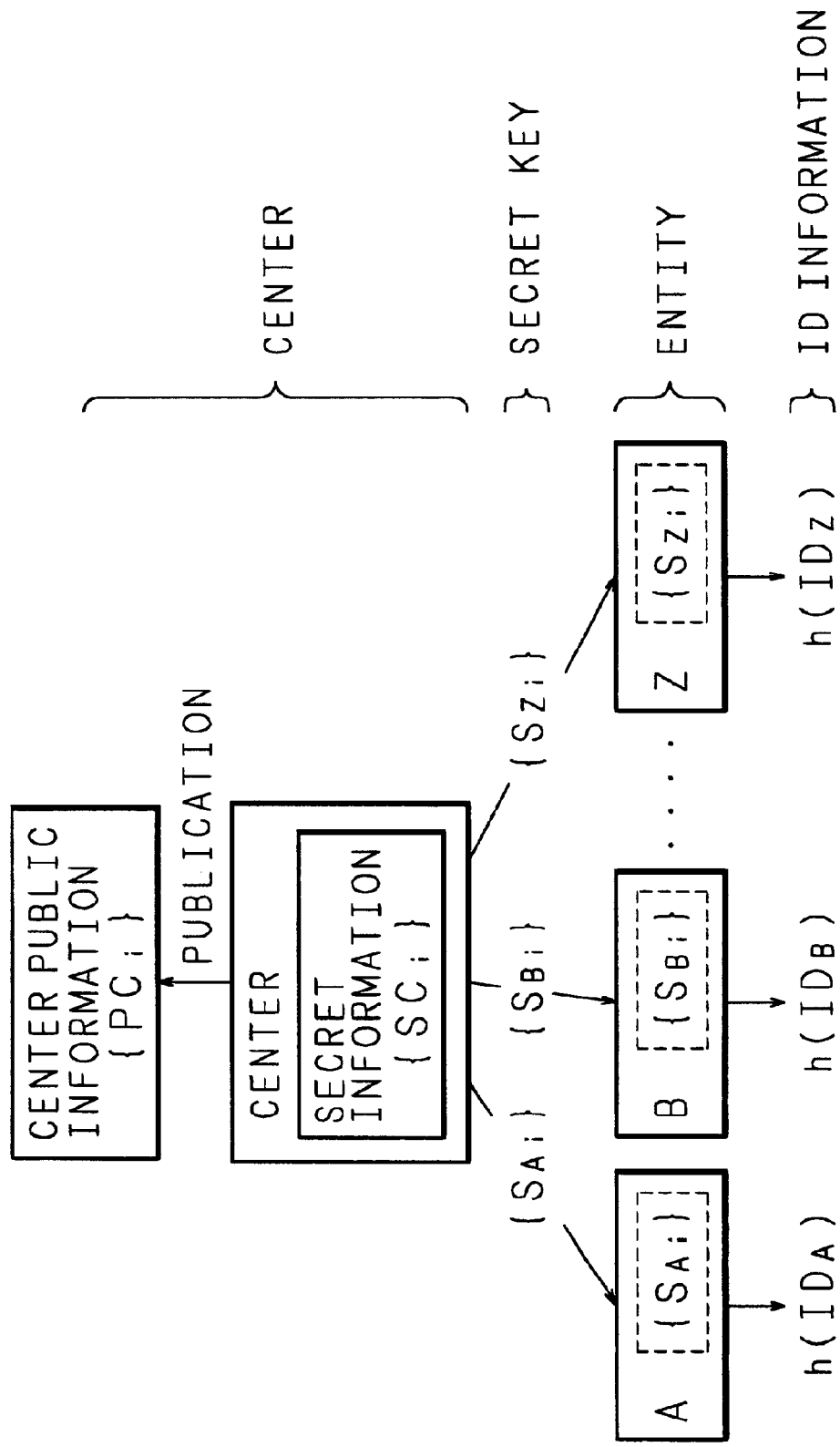
FIG. 1 is an illustration showing the theoretical structure of an ID-NIKS system.
Figure 2:
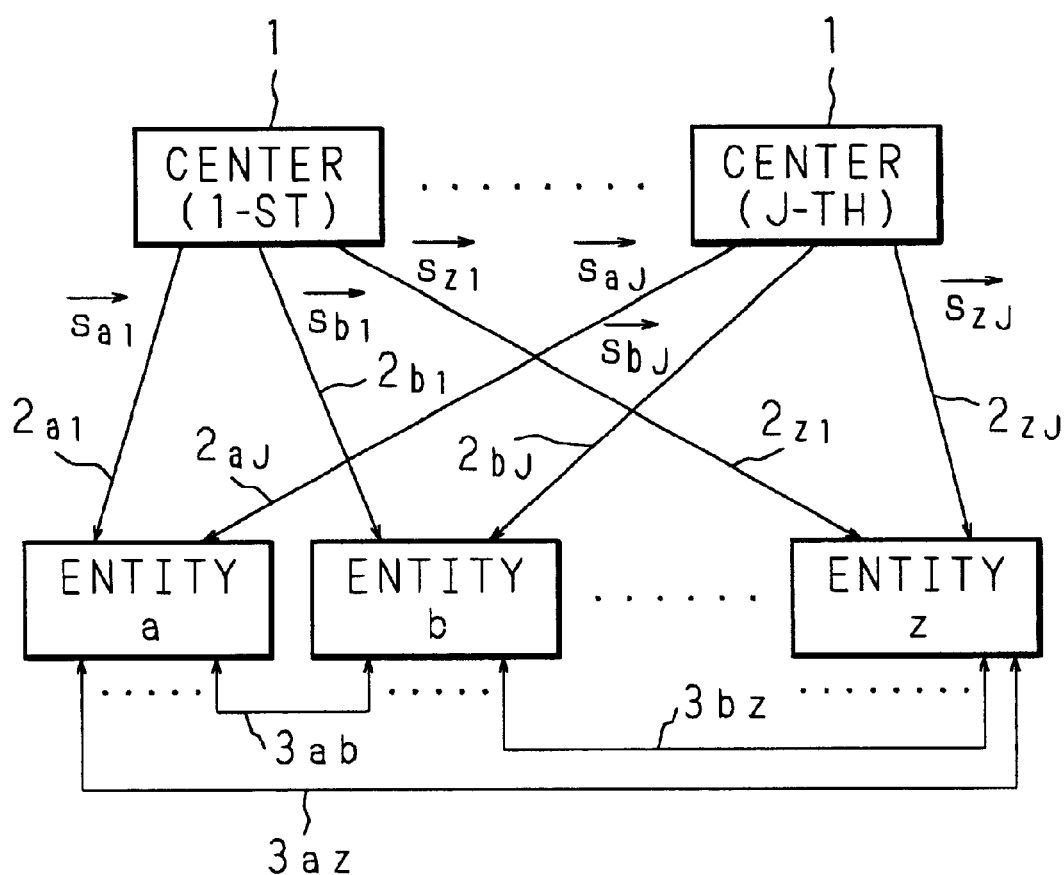
FIG. 2 is a schematic diagram showing the structure of a cryptographic communication system of the present invention.

FIG. 2 is a schematic diagram showing the structure of a cryptographic communication system of the present invention. A plurality (number J) of centers 1 as key generating agencies that can be trusted for the secrecy of information are set and, for example, public organizations in the society can be chosen as the centers 1.

Each of these centers 1 is connected to a plurality of entities a, b, . . . , z as the users of this cryptographic communication system via communication channels $2_{a1}, \ldots, 2_{aJ}, 2_{b1}, \ldots, 2_{bJ}, \ldots, 2_{z1}, \ldots, 2_{zJ}$, and the secret keys of the respective entities are sent from the centers 1 to the entities a, b, . . . , z via these communication channels, respectively. Moreover, communication channels 3ab, 3az, 3bz, . . . are provided between two entities so that a ciphertext obtained by encrypting communication information is transmitted between the respective entities via the communication channels 3ab, 3az, 3bz, . . . .

Figure 3:
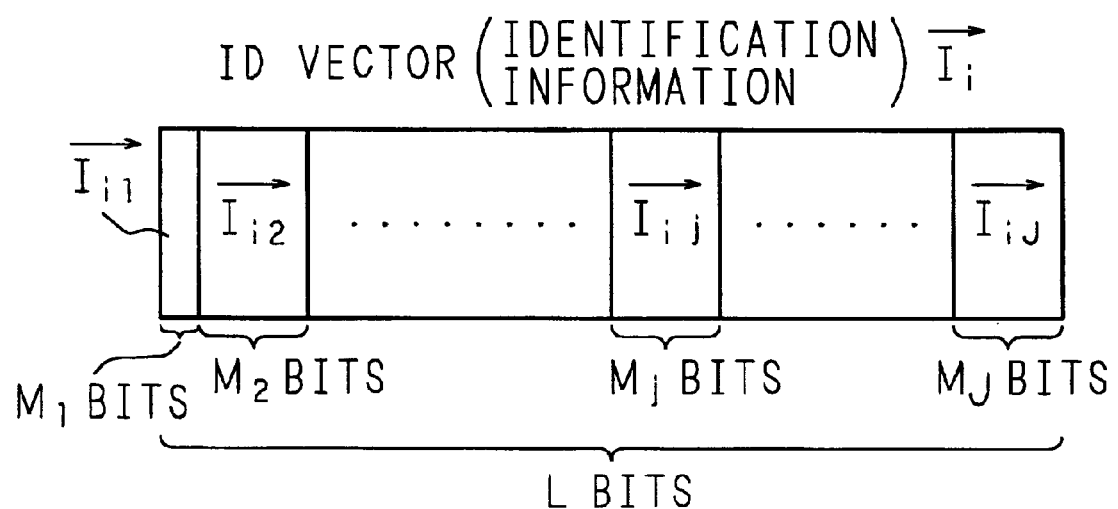
FIG. 3 is a schematic diagram showing an example of how an ID vector of an entity is divided.

Let an ID vector as the identification information showing the name and address of each entity be an L-dimensional binary vector and, as shown in FIG. 3, the ID vector is divided into J blocks in block sizes $M_1, M_2, \ldots, M_J$. For example, the ID vector (vector $I_i$) of an entity i is divided as shown by equation (1) below. Each vector $I_{ij}$ (j=1, 2, . . . , J) as the divided identification information will be referred to as the "ID division vector". Here, when $M_j=M$, all the ID division vectors have an equal size. It is also possible to set $M_j=1$. Further, the publicized ID vector of each entity is converted into L bits by a hash function.

$$\vec{I_i} = [\overrightarrow{I_{i1}}|\overrightarrow{I_{i2}}|\ldots|\overrightarrow{I_{iJ}}] \quad (1)$$

(Preliminary Process at Center 1)

The centers 1 prepare the following public keys and secret keys, and publicize the public keys.

Public key P A large prime number.

J The number of blocks into which an ID vector is divided.

$M_j$ The size of the divided ID vector (j=1, 2, . . . , J),

L The size of the ID vector $(L=M_1+M_2+ \ldots +M_J)$.

Secret key g A primitive element of GF (P).

$H_j$ A $2^{M_j} \times 2^{M_j}$ symmetric matrix consisting of random numbers (j=1, 2, . . . , J).

$\alpha_{ij}$ Private secret random number of entity i (however, $\alpha_{i1} \alpha_{i2} \ldots \alpha_{iJ} \equiv 1 \pmod{P-1}$).

(Registration of Entity)

The centers 1 requested by the entity i to register the entity i calculate J secret key vectors $s_{ij}$ (j=1, 2, . . . , J) corresponding to the prepared keys and J ID division vectors of the entity i according to equations (2-1), (2-2), . . . , (2-J) below and send the calculated vectors $s_{ij}$ in secrecy to complete the registration.

$$\overrightarrow{S_{i1}} \equiv g^{\alpha_{i1} H_1[\overrightarrow{I_{i1}}]} \pmod{P} \quad (2\text{-}1)$$

$$\overrightarrow{S_{i2}} \equiv \alpha_{i2} H_2[\overrightarrow{I_{i2}}] \pmod{P-1} \quad (2\text{-}2)$$

$$\vdots$$

$$\overrightarrow{S_{iJ}} \equiv \alpha_{iJ} H_J[\overrightarrow{I_{iJ}}] \pmod{P-1} \quad (2\text{-}J)$$

However, if g is a scalar and A and B are matrices, $B=g^A$ represents raising g to the power of each component ($\mu$, $\upsilon$) of A. Specifically, it is written as shown by equation (3). Moreover, $H_j$ [vector $I_{ij}$] denotes the vector of one row corresponding to the vector $I_{ij}$ extracted from the symmetric matrix $H_j$, and the operation of [•] is defined as reference.

$$B_{\mu\nu} = g^A{}_{\mu\nu} \quad (3)$$

(Process of Generating Common Key between Entities)

The entity i selects from its own secret key vector $s_{i1}$ a vector $s_{i1}$ [vector $I_{m1}$] as a component corresponding to a vector $I_{m1}$ as an ID division vector of an entity m, and also selects from its own secret key vector $s_{ij}$ a vector $s_{ij}$ [vector $I_{mj}$] as a component corresponding to a vector $I_{mj}$ for each block, where j=2, . . . , J. Then, in modulo P, with the vector $s_{i1}$ [vector $I_{m1}$] as the base, it is raised sequentially to the power of every remaining vector $S_{ij}$ [vector $I_{mj}$] (j=2, . . . , J) to generate a common key $K_{im}$. Specifically, the arithmetic operation for generating this common key $K_{im}$ is equation (4), and this common key $K_{im}$ is identical with a common key $K_{mi}$ calculated from the entity m.

$$K_{im} \equiv \overrightarrow{S_{i1}}[\overrightarrow{I_{m1}}]^{\overrightarrow{S_{i2}}[\overrightarrow{I_{m2}}]\ldots\overrightarrow{S_{iJ}}[\overrightarrow{I_{mJ}}]} \quad (4)$$

$$\equiv g^{\alpha_{i1}\ldots\alpha_{iJ} H_1[\overrightarrow{I_{i1}}][\overrightarrow{I_{m1}}]\ldots H_J[\overrightarrow{I_{iJ}}][\overrightarrow{I_{mJ}}]}$$

$$\equiv g^{H_1[\overrightarrow{I_{i1}}][\overrightarrow{I_{m1}}]\ldots H_J[\overrightarrow{I_{iJ}}][\overrightarrow{I_{mJ}}]} \pmod{P}$$

Figure 4:
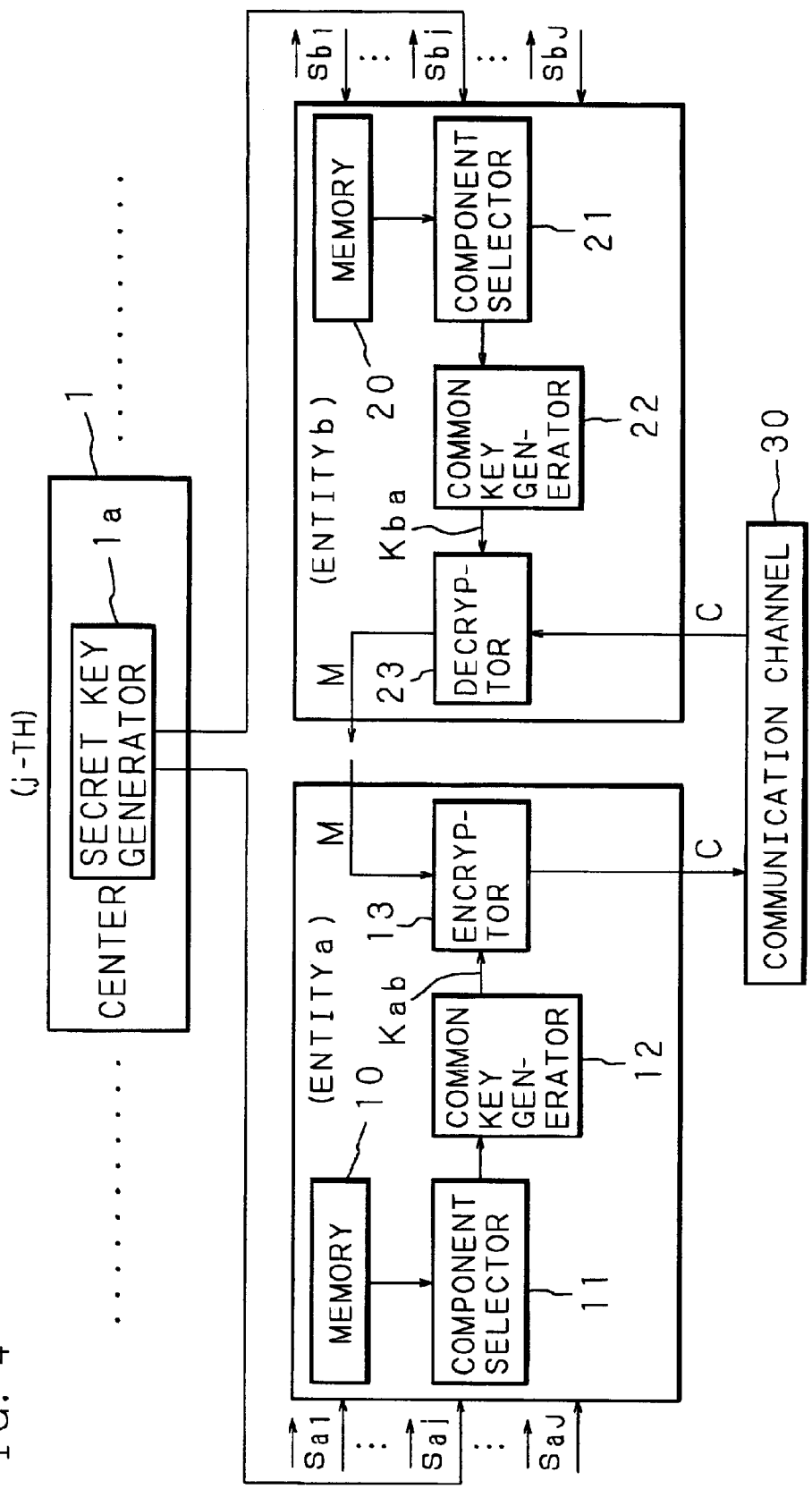
FIG. 4 is a schematic diagram showing a state of information communication between two entities.

Next, the following description will explain information communication between entities according to the above-described cryptosystem. FIG. 4 is a schematic diagram showing a state of information communication between two entities, a and b. The example shown in FIG. 4 illustrates a case where the entity a encrypts a plaintext (message) M into a ciphertext C and transmits the ciphertext C to the entity b, and the entity b decrypts the ciphertext C into the original plaintext (message) M.

The j-th (j=1, 2, . . . , J) center 1 is provided with a secret key generator 1a for calculating the vectors $s_{aj}$, $s_{bj}$ (secret keys) of the entities a and b according to equation (2-j) shown above. Upon a request for registration from each of the entities a and b, the secret key vectors $s_{aj}$, $s_{bj}$ of the entities a and b are sent to the entities a and b, respectively.

The entity a is provided with a memory 10 storing the secret key vectors $s_{a1}, \ldots, s_{aj}, \ldots, s_{aJ}$ sent from the J centers 1 in table form; a component selector 11 for selecting from these secret key vectors the vector $s_{a1}$ [vector $I_{b1}$], . . . , vector $s_{aj}$ [vector $I_{bj}$], . . . , vector $s_{aJ}$ [vector $I_{bJ}$] as the components corresponding to the entity b; a common key generator 12 for generating a common key $K_{ab}$ desired by the entity a for use with the entity b by using these selected components; and an encryptor 13 for encrypting the plaintext (message) M into the ciphertext C by using the common key $K_{ab}$ and for outputting the ciphertext C to a communication channel 30.

Meanwhile, the entity b is provided with a memory 20 storing the secret key vectors $s_{b1}, \ldots, s_{bj}, \ldots, s_{bJ}$ sent from the respective centers 1 in table form; a component selector 21 for selecting from these secret key vectors the vector $s_{b1}$ [vector $I_{a1}$], . . . , vector $s_{bj}$ [vector $I_{aj}$], . . . , vector $s_{bJ}$ [vector $I_{aJ}$] as the components corresponding to the entity a; a common key generator 22 for generating a common key $K_{ba}$ desired by the entity b for use with the entity a by using these selected components; and a decryptor 23 for decrypting the ciphertext C input from the communication channel 30 into the plaintext (message) M by using the common key $K_{ba}$ and for outputting the plaintext (message) M.

For the transmission of information from the entity a to the entity b, first, the secret key vectors $s_{a1}, s_{a2}, \ldots, s_{aJ}$ which were calculated at the respective centers 1 according to equations (2-1), (2-2), . . . (2-J) and stored in the memory 10 in advance are read into the component selector 11. Then, the vector $s_{a1}$ [vector $I_{b1}$], vector $s_{a2}$ [vector $I_{b2}$], . . . , vector $s_{aJ}$ [vector $I_{bJ}$] as the components corresponding to the entity b are selected by the component selector 11 and sent to the common key generator 12. In the common key generator 12, the common key $k_{ab}$ is calculated according to equation (4) by using these components, and sent to the encryptor 13. In the encryptor 13, the plaintext (message) M is encrypted into the ciphertext C by using this common key $K_{ab}$, and the ciphertext C is transmitted via the communication channel 30.

The ciphertext C transmitted via the communication channel 30 is input to the decryptor 23 of the entity b. The secret key vectors $s_{b1}, s_{b2}, \ldots, s_{bJ}$ which were calculated at the respective centers 1 according to equations (2-1), (2-2), . . . (2-J) and stored in the memory 20 in advance are read into the component selector 21. In the component selector 21, the vector $s_{b1}$ [vector $I_{a1}$], vector $s_{b2}$ [vector $I_{a2}$], . . . , vector $s_{bJ}$ [vector $I_{aJ}$] as the components corresponding to the entity a are selected, and sent to the common key generator 22. In the common key generator 22, the common key $K_{ba}$ is calculated according to equation (4) by using these components, and then sent to the decryptor 23. In the decryptor 23, the ciphertext C is decrypted into the plaintext (message) M by using this common key $K_{ba}$.

Here, the following description will explain setting of a hash value at each center 1, which is a characteristic feature of the present invention. In the following example, four (J=4) centers 1 already exist in a cryptographic communication system as shown in FIG. 2, and one or a plurality of new centers 1 are added to this system. Here, suppose that a hash value to be set for each center 1 consists of 10 bits.

For example, in the case where four new centers 1 are added, new hash values, each consisting of 10 bits, are to be set. According to a conventional technique, a new hash function system of 80 bits is constructed for a total of eight centers 1. In this case, therefore, the hash values of the existing centers 1 are changed. Hence, with the conventional technique, a time-consuming process of setting a hash value must be performed whenever a new center is added to the cryptographic communication system.

In the present invention, new hash values are set for the added centers 1, respectively, in the following manner. Let a data sequence consisting of a sequence of the hash values of the respective existing four centers 1 be a predetermined original hash-value sequence of 40 bits (for example, a hash value of the first center 1 consists of the first to tenth bits, a hash value of the second center 1 consists of the eleventh to twentieth bits, a hash value of the third center 1 consists of the twenty-first to thirtieth bits, and a hash value of the fourth center 1 consists of the thirty-first to fortieth bits). For each new center 1, ten bits of any order are selected from the predetermined original hash-value sequence of 40 bits so that the combination of the selected ten bits is not identical with the combinations of the bits of the existing centers 1, and the selected bits are set as a hash value of each new center 1. For instance, the first, third, eighth, tenth, sixteenth, twenty-first, twenty-second, twenty-seventh, thirty-third and thirty-fifth bits are selected from this 40-bit original hash-value sequence and set as the hash value of one new center 1. There are $_{40}C_{10}$ patterns for such selection of bits, and thus the present invention can cope with the addition of an extremely large number of centers 1.

Accordingly, the present invention can set hash values for the newly added four centers 1 without changing the hash values of the existing four centers 1. Even when a new center 1 is added, there is no need to redesign the hash function system. It is therefore possible to add a number of new centers 1 very easily while enhancing the security.

Figure 5:
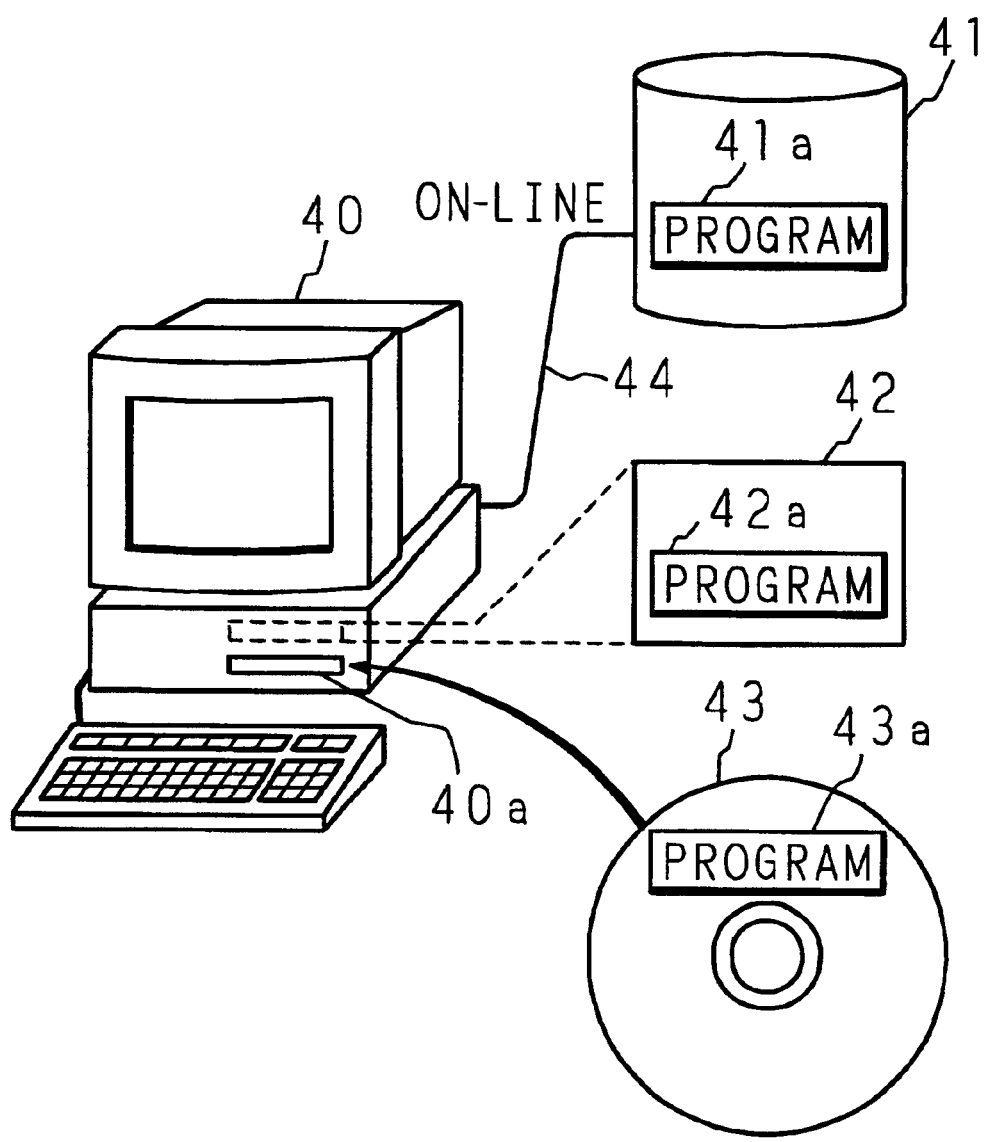
FIG. 5 is an illustration showing the structure of an embodiment of a memory product.

FIG. 5 is an illustration showing the structure of an embodiment of a memory product according to the present invention. A program illustrated as an example here includes a process of generating a secret key of each entity at each center 1 by using the ID division vector of the entity and a hash value, and is recorded on a memory product as to be explained below. Besides, a computer 40 is provided for each center 1.

In FIG. 5, a memory product 41 to be on-line connected to the computer 40 is implemented using a server computer, for example, WWW (World Wide Web), located in a place distant from the installation location of the computer 40, and a program 41a as mentioned above is recorded on the memory product 41. The program 41a read from the memory product 41 via a transfer medium 44 such as a communication channel controls the computer 40 so as to generate a secret key of each entity at each center 1.

A memory product 42 provided inside the computer 40 is implemented using, for example, a hard disk drive or a ROM installed in the computer 40, and a program 42a as mentioned above is recorded on the memory product 42. The program 42a read from the memory product 42 controls the computer 40 so as to generate a secret key of each entity at each center 1.

A memory product 43 used by being loaded into a disk drive 40a installed in the computer 40 is implemented using, for example, a removable magneto-optical disk, CD-ROM, flexible disk or the like, and a program 43a as mentioned above is recorded on the memory product 43. The program 43a read from the memory product 43 controls the computer 40a so as to generate a secret key of each entity at each center 1.

As described in detail above, in the present invention, since a hash value is set for each center by selecting a plurality of bits of any order for each center from a predetermined sequence of a plurality of bits, it is possible to simply set a hash value different from those of the existing centers for a new center without changing the hash values of the existing centers and to readily add a number of new centers to a cryptographic communication system based on the ID-NIKS.

As this invention may be implemented in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A cryptographic communication system which permits a plurality of entities to mutually perform an encryption process for encrypting a plaintext as information to be transmitted into a ciphertext and a decryption process for decrypting the transmitted ciphertext into the original plaintext, the system comprising:

a plurality of key generating agencies, each of which generates a secret key of each entity by using each of divided identification information obtained by dividing identification information of each entity into a plurality of blocks and a hash value which consists of a plurality of bits and is set for each of the key generating agencies and sends the generated secret key to each entity; and a plurality of entities, each of which generates a common key for use in the encryption process and decryption process by using components corresponding to an entity to be communicated with, contained in its own secret keys sent from the key generating agencies, respectively, wherein the hash value is set for each of the key generating agencies, by selecting a plurality of bits of any order for each of the key generating agencies from a predetermined sequence of a plurality of bits, and wherein, when a new key generating agency is added to a plurality of existing key generating agencies, a hash value is set for the new key generating agency by selecting a plurality of bits of any order from an original hash-value sequence consisting of a sequence of hash values set for the existing key generating agencies.

2. A method of permitting a plurality of entities to mutually perform an encryption process for encrypting a plaintext as information to be transmitted into a ciphertext and a decryption process for decrypting the transmitted ciphertext into the original plaintext, the method comprising:

generating a secret key for a plurality of key generating agencies by dividing identification information of each entity into a plurality of blocks and setting a hash value which consists of a plurality of bits for each of the key generating agencies and sending the generated secret key to each entity; and generating a common key for a plurality of entities for use in the encryption process and decryption process by using components corresponding to an entity to be communicated with, contained in its own secret keys sent from the key generating agencies, respectively, wherein setting the hash value for each of the key generating agencies is provided by selecting a plurality of bits of any order for each of the key generating agencies from a predetermined sequence of a plurality of bits, and wherein, when a new key generating agency is added to a plurality of existing key generating agencies, setting a hash value for the new key generating agency is provided by selecting a plurality of bits of any order from an original hash-value sequence consisting of a sequence of hash values set for the existing key generating agencies.

* * * * *